United States Patent [19]
Cusack et al.

[11] Patent Number: 5,670,784
[45] Date of Patent: Sep. 23, 1997

[54] HIGH TEMPERATURE GAS STREAM OPTICAL FLAME SENSOR

[75] Inventors: Diedre E. Cusack, Groton, Mass.; William M. Glasheen, Derry, N.H.; George P. Sacco, Jr., Wakefield; Helmar R. Steglich, Marblehead, both of Mass.

[73] Assignee: Ametek Aerospace Products, Wilmington, Mass.

[21] Appl. No.: 296,711

[22] Filed: Aug. 26, 1994

[51] Int. Cl.⁶ .............................. G01J 5/20; G08B 17/12
[52] U.S. Cl. ........................... 250/372; 250/370.01
[58] Field of Search .................. 250/339.15, 372, 250/370.01

[56] References Cited

U.S. PATENT DOCUMENTS

| 4,029,966 | 6/1977 | Baker et al. | 250/372 |
| 4,529,881 | 7/1985 | Ceurvels et al. | 250/353 |
| 5,041,727 | 8/1991 | Kojima et al. | 250/370.15 X |
| 5,093,576 | 3/1992 | Edmond et al. | 250/370.01 |
| 5,257,496 | 11/1993 | Brown et al. | 60/39.06 |
| 5,378,642 | 1/1995 | Brown et al. | 437/40 |

*Primary Examiner*—Edward J. Glick
*Attorney, Agent, or Firm*—Amster, Rothstein & Ebenstein

[57] ABSTRACT

A high temperature gas stream optical flame sensor for flame detection in gas turbine engines, the sensor generally comprising a silicon carbide photodiode and silicon carbide based amplification hardware for generating a signal indicative of the presence of the flame, in some embodiments the photodiode and amplification hardware being disposed within a sensor housing, in another embodiment for use in an aeroderivative premixed combustion system, the photodiode being situated within a fuel/air premixer.

8 Claims, 12 Drawing Sheets

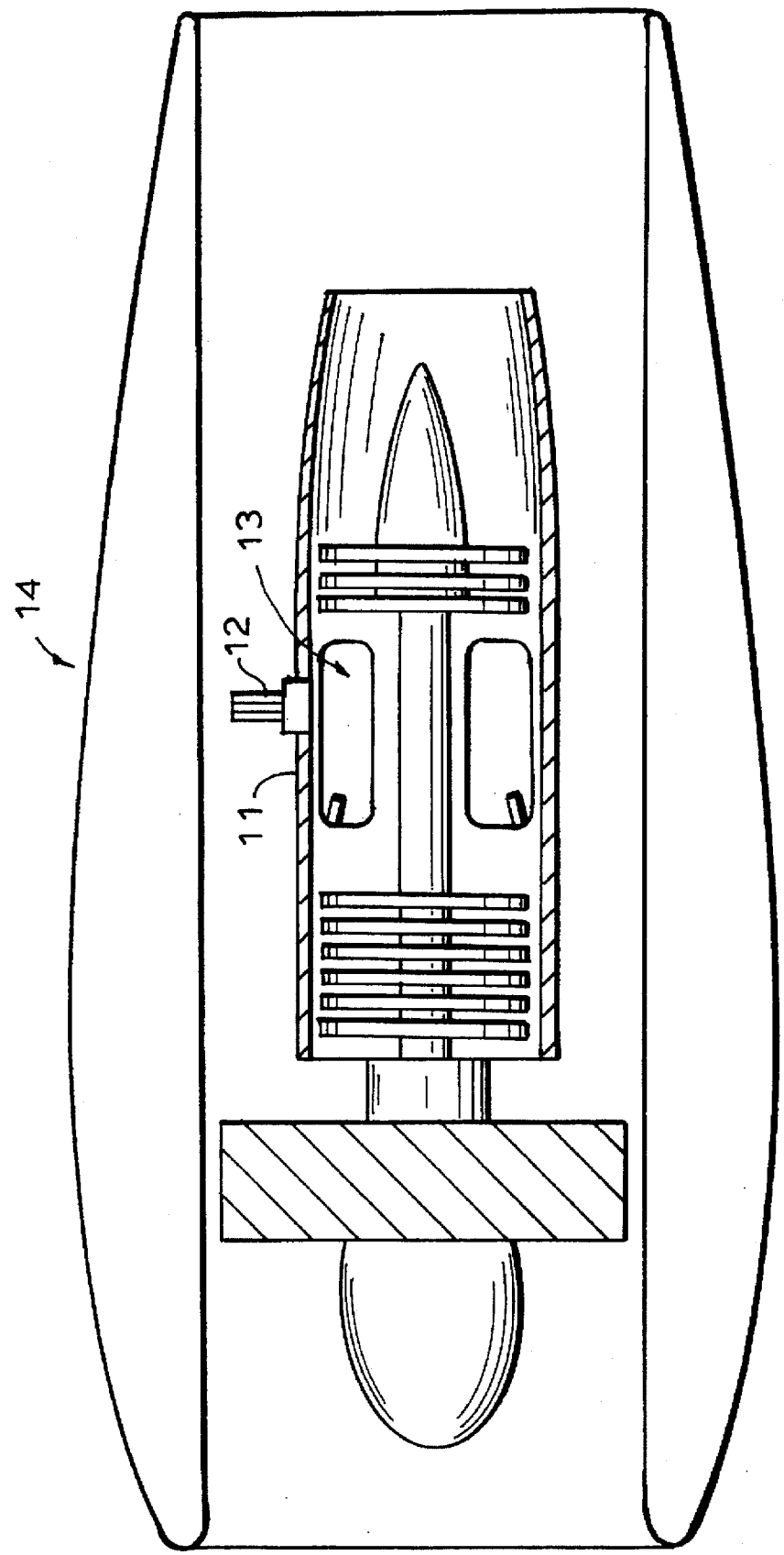

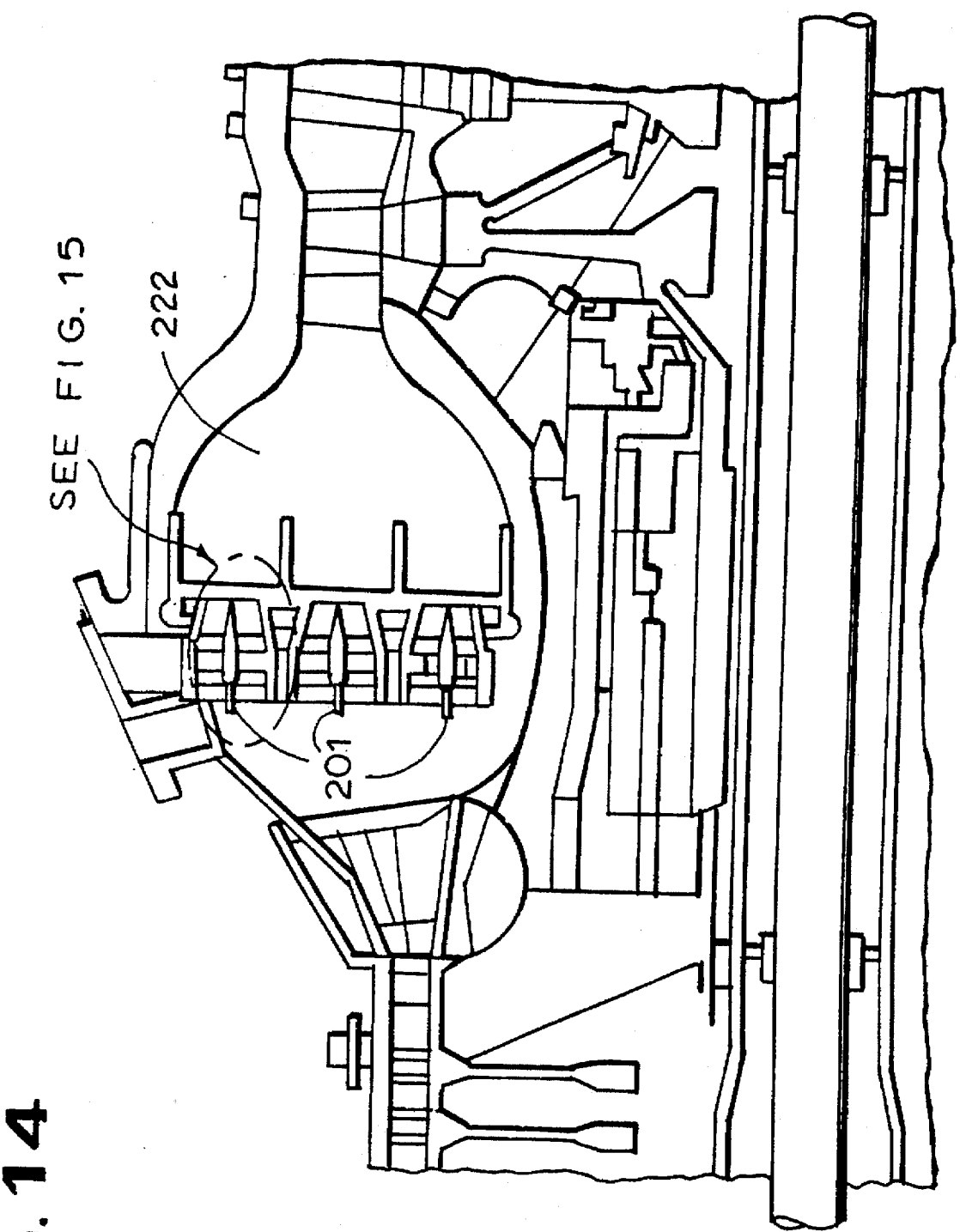

HIGH TEMPERATURE GAS STREAM OPTICAL FLAME SENSOR

BACKGROUND

This invention relates generally to an optical sensor for flame detection, and more particularly, to a high temperature silicon carbide based sensor for use in gas turbine engines for detecting the presence of a combustion flame and/or an afterburner flame.

The most common method for flame detection in gas turbine engines, either for aircraft and marine propulsion or for land based power generation, is by a light activated or photosensitive gas-tube discharge detector. Such detector consists of a phototube having a cathode which is photoemissive (i.e., it emits electrons when illuminated), and an anode for collecting the electrons emitted by the cathode. The tube is filled with a gas at low pressure which is ionized by any accelerated electrons. A large voltage potential is applied to and maintained between the cathode and the anode such that in the presence of a flame, photons of a given energy level illuminate the cathode and cause electrons to be released and accelerated by the electric field, thereby ionizing the gas and causing amplification until a much larger photocurrent measured in electrons is produced. If the electrical field is continually maintained, the device will conduct electrons even when the photons stop, until the metal surfaces are depleted, thus functioning in a manner similar to the "start circuit" of a gas discharge lamp. To ensure tube longevity and to prevent faulty "on" indications, a large AC voltage is applied through a resister/inductor circuit to the sensor. In this manner, the device acts like a single wave rectifier since the tube only conducts when both the voltage is high and photons are present. When the voltage drops, the tube stops conducting and will not conduct any further photocurrent until the next time it is illuminated in the presence of photons. Although such an apparatus is well proven, having been used reliably for many years in a wide range of applications, specifically with gas turbine engines, it has several drawbacks.

Typically, a very large AC potential in excess of 200 Volts is required. This equates to a power drain of approximately 7 Watts, by far the largest energy user of all engine sensors. Moreover, such an apparatus suffers from degraded performance when the surrounding temperatures exceed 400 degrees F. due to changes in the properties of the metal components at such elevated temperatures. Accordingly, some gas turbine engines require the use of specifically dedicated cooling equipment to maintain the sensor temperature at acceptable levels. Such collateral cooling systems, however, place additional demands on the system, add cost and weight, and decrease reliability.

Another system for flame detection, specifically for detecting the presence of an afterburner flame in augmented gas turbine engines, is disclosed in U.S. Pat. No. 4,510,794 to Couch. The Couch system relies on an ion/electrostatic probe which provides ionic flame detection and electrostatic engine wear monitoring by measuring the conductivity through the plasma of the afterburner flame.

As modern electronic systems have replaced archaic tube-based hardware with semiconductor components, photodiodes have been implemented in applications for measuring or detecting the presence of light throughout the visible and ultraviolet spectrum. Their smaller size, greater stability, enhanced reliability and lower cost make them vastly superior to the phototube.

The photodiode is a p-n junction device with an associated depletion region wherein an electric field separates photogenerated electron-hole pairs, the movement of which generates measurable current. When electromagnetic radiation of an appropriate magnitude strikes the semiconductor material, the electron-hole pairs are generated by photoconductive action. When these charge carriers are generated near a p-n junction, the electric field of the depletion layer at the junction separates the electrons from the holes in the normal p-n junction fashion. This separation produces a short circuit or open circuit voltage, technically referred to as the photovoltaic effect. Such photodiodes are of the type disclosed in U.S. Pat. No. 5,093,576 to Edmond et al.

U.S. Pat. Nos. 5,303,684 and 5,257,496, both to Brown et al., disclose a combustion control system for controlling the level of $NO_x$ emissions produced in the combustion process to reduce such emissions while maintaining a sufficiently high combustion flame temperature. This is achieved by monitoring the intensity of non-infrared spectral lines associated with the combustion flame, and then dynamically adjusting the fuel/air ratio of the fuel mixture. These patents describe in a general sense the use of silicon carbide (Sic) photodiodes to measure light intensity in a system for generating a signal correlating to the $NO_x$ emission concentration for adjustment of engine operating parameters. However, these patents do not disclose specific structures capable of reliable use in the high temperature environment near the combustion section or afterburner section of a gas turbine engine.

Accordingly, it is an object of a present invention to provide an optical flame sensor comprised of a silicon carbide detector and silicon carbide amplification circuitry in a unitary assembly for attachment to the wall of a gas turbine engine.

It is yet another object of the present invention to provide an optical flame sensor capable of operating in a high temperature environment without the need for additional cooling equipment.

It is still another object of the present invention to provide an optical flame sensor of compact and light weight construction and enhanced reliability.

It is yet another object of the present invention to provide an optical flame sensor for detecting the presence of afterburner light-off in afterburning gas turbine engines, wherein the sensor contains optical filtering means for rejecting electromagnetic radiation λ in excess of 270 nanometers to eliminate false indications caused by incident solar radiation.

It is a further object of the present invention to provide an optical flame sensor disposed within the center-body fairing of a fuel/air premixer in an aeroderivative gas turbine engine.

SUMMARY OF THE INVENTION

In accordance with the above objects and additional objects which will become apparent hereinafter, the present invention provides multiple embodiments of a high temperature gas stream optical flame sensor.

In a first embodiment, the sensor is comprised of a generally elongated housing having an internally disposed detector assembly, amplifier assembly and optical assembly. The detector assembly includes a detector housing having a suitable optical element or lens (e.g. synthetic sapphire or the like) disposed in a window or aperture at one end thereof, and a ceramic header containing a silicon carbide photodiode at the other end thereof.

The amplification circuitry includes a dual JFET silicon carbide transistor preamplifier coupled to the silicon carbide photodiode and a high temperature operational amplifier. The system operates by the application of a positive and negative voltage source (in the preferred embodiment approximately +7.5 Volts and −7.5 Volts). When exposed to electromagnetic radiation of wavelength $\lambda$ in the spectral range of from about 190 to 400 nanometers, preferably within the ultraviolet range of from about 190 to 270 nanometers, the photodiode generates a proportional photocurrent which is processed and amplified through the operational amplifier to produce an output signal indicative of the presence of the flame.

The incident ultraviolet radiation is directed onto the detector through a lens assembly attached to the housing. This lens assembly is comprised of a lens (e.g., sapphire) disposed in a KOVAR lens holder. KOVAR covers a group of alloys which exhibit a sharp change in coefficient of expansion at certain temperatures. Such radiation is directed through a second lens (disposed in the detector assembly) and is thereby concentrated onto the photodiode.

In a second embodiment of the invention where the detector is non-collinearly aligned with the optical lens, the sensor includes a mirrored internally disposed optical block assembly for directing the incident radiation onto the detector. The mirrors may be coated to reject incident radiation in excess of 270 nanometers (e.g., visible light, particularly sunlight) when used for afterburner flame detection where sunlight entering the engine nozzle could trigger false indications of afterburner light-off.

In a third embodiment, the sensor is disposed within the fuel/air premixer of an aeroderivative gas turbine engine. In such an engine, air and fuel are premixed prior to combustion by a plurality of fuel/air premixers. These contain a center-body fairing in which the detector may be situated. To keep the detector components shielded from the extreme temperatures inside the combustion chamber, the incident radiation is communicated to the detector through a fiber-optic cable. In this embodiment, the amplification circuitry is disposed at a remote location and communicates with the detector through a suitable electrical connector attached to the fairing.

DESCRIPTION OF THE DRAWINGS

FIG. 1A is a schematic view of a gas turbine engine and a sensor disposed at the combustion section thereof;

FIG. 14 is a partial schematic view of an aeroderivative gas turbine engine having a premixed combustion system;

DETAILED DESCRIPTION OF THE PREFERRED EMBODIMENT

Figure 1B:
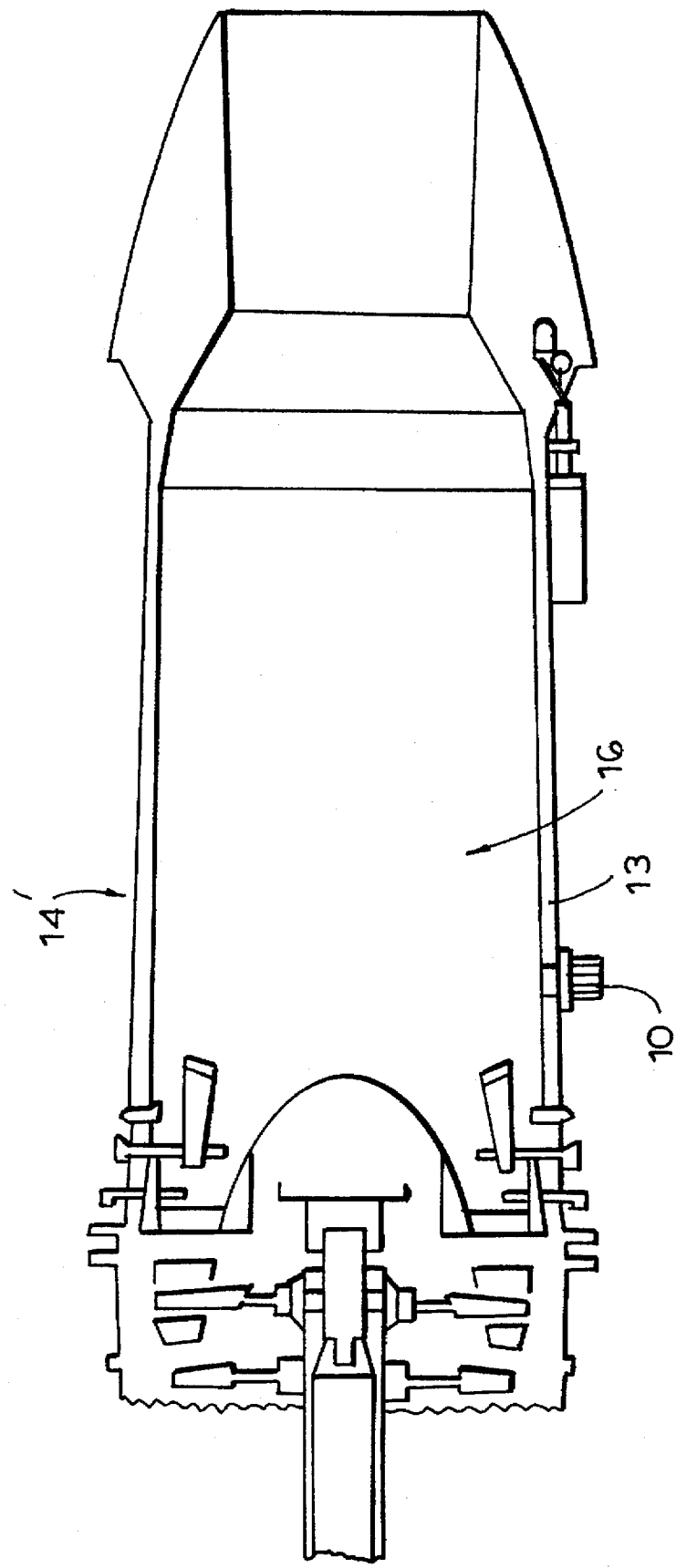
FIG. 1B is a partial schematic view of an augmented gas turbine engine showing the sensor disposed at the afterburner section thereof.

With reference to the several views of the drawings, there is depicted a high temperature gas stream optical flame sensor ("sensor") 10 depicted in exemplary applications for (1) detecting the presence of a flame in the combustion chamber 11 of a gas turbine (e.g. a turbofan) engine 14 (FIG. 1A), and (2) situated proximal to the nozzle section 16 of an augmented afterburning gas turbine engine 14 (FIG. 1B) for determining when afterburner light-off has been achieved or when afterburner shut-down occurs. In either application, the sensor 10 is optically exposed to the flame through a suitable aperture or window in the engine wall 13.

Figure 2A:
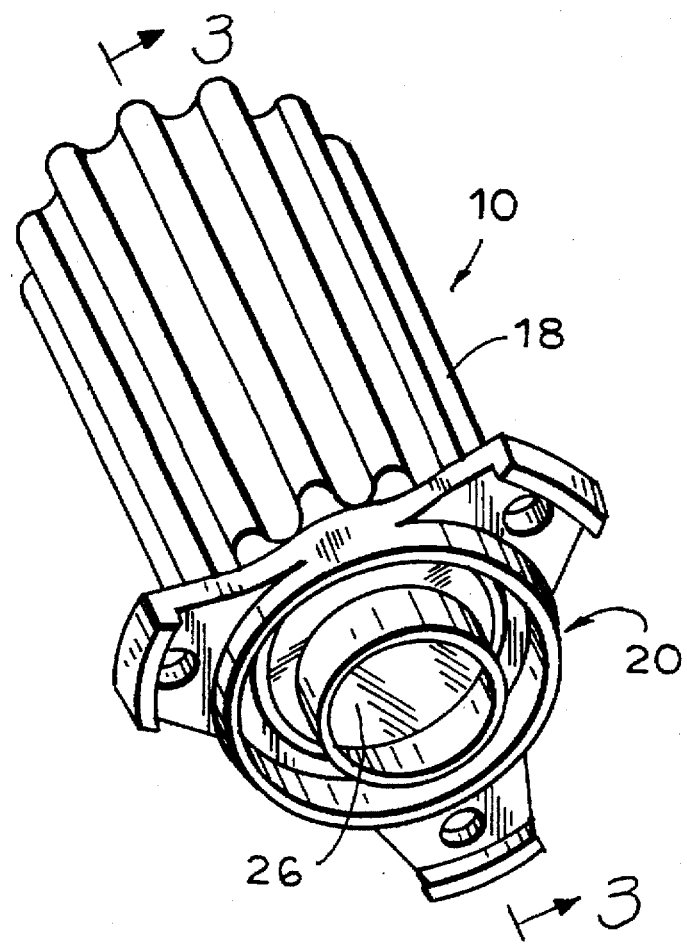
FIG. 2A is an isometric view of a first embodiment of the sensor.
Figure 10:
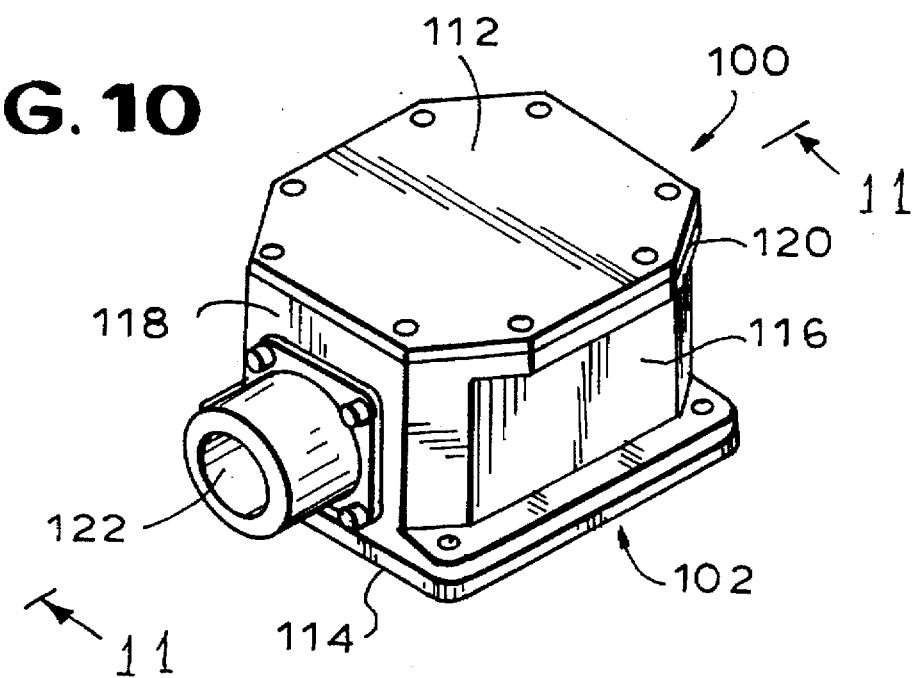
FIG. 10 is an isometric view of a second embodiment of the sensor.
Figure 2B:
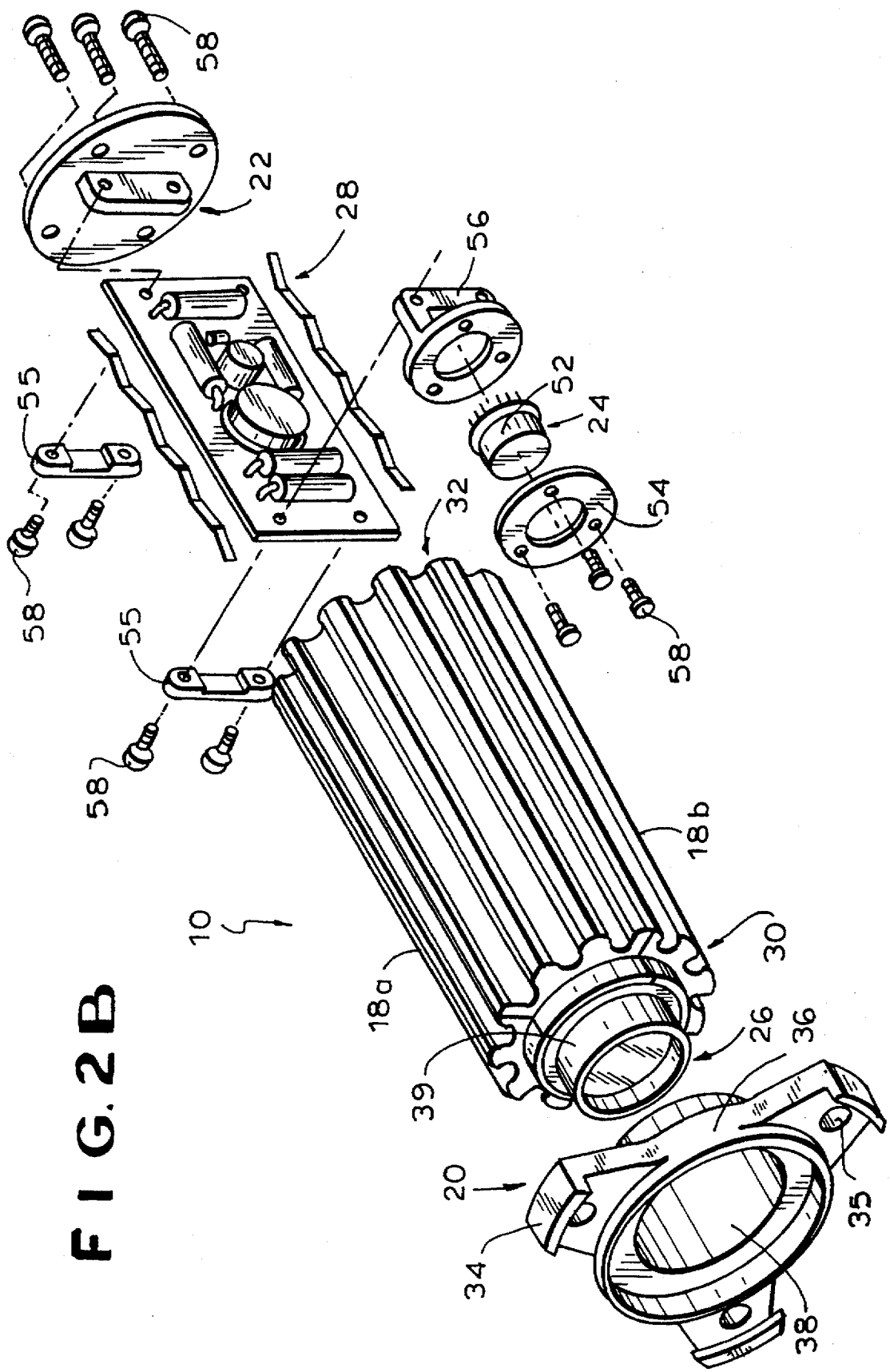
FIG. 2B is an exploded isometric view of the first embodiment.

In a first embodiment as shown in FIGS. 2A and 2B, sensor 10 is generally comprised of an elongated housing assembly 18, an attachment flange 20, a cover 22, a detector assembly 24, a lens assembly 26, and an electronic amplification assembly 28. The housing assembly 18 may be fabricated from, for example, stainless steel and can be first extruded in two halves 18a, 18b and then machine grooved to provide a plurality of fins to facilitate heat transfer for cooling. The housing halves 18a, 18b may be brazed to each other by conventional techniques to form the final housing assembly. Housing 18 is defined by a first end 30 and a second end 32. The housing 18 is generally configured having an elongated cylindrical shape forming a hollow interior in which the respective detector components and amplification circuitry are disposed as depicted in FIGS. 2B and 3 and described below.

The attachment flange 20 is constructed and arranged to facilitate attachment of the sensor 10 to the engine wall (i.e., in the vicinity of the combustion section and/or the afterburner section) of the gas turbine engine. Flange 20 defines a plurality of ribs 34 which project radially outwards from an integral center hub 36 where the hub defines a centrally disposed aperture 38 therethrough. Each of the ribs 34 include apertures 35 through which conventional fastening means such as screws or the like are inserted into and retained by the engine wall of the gas turbine engine. The attachment flange 20 fits over and is brazed to the circumferential peripheral surface 39 of housing 18 at the first end 30 thereof. This can be implemented in the same step where the housing halves 18a, 18b are joined.

Figure 3:
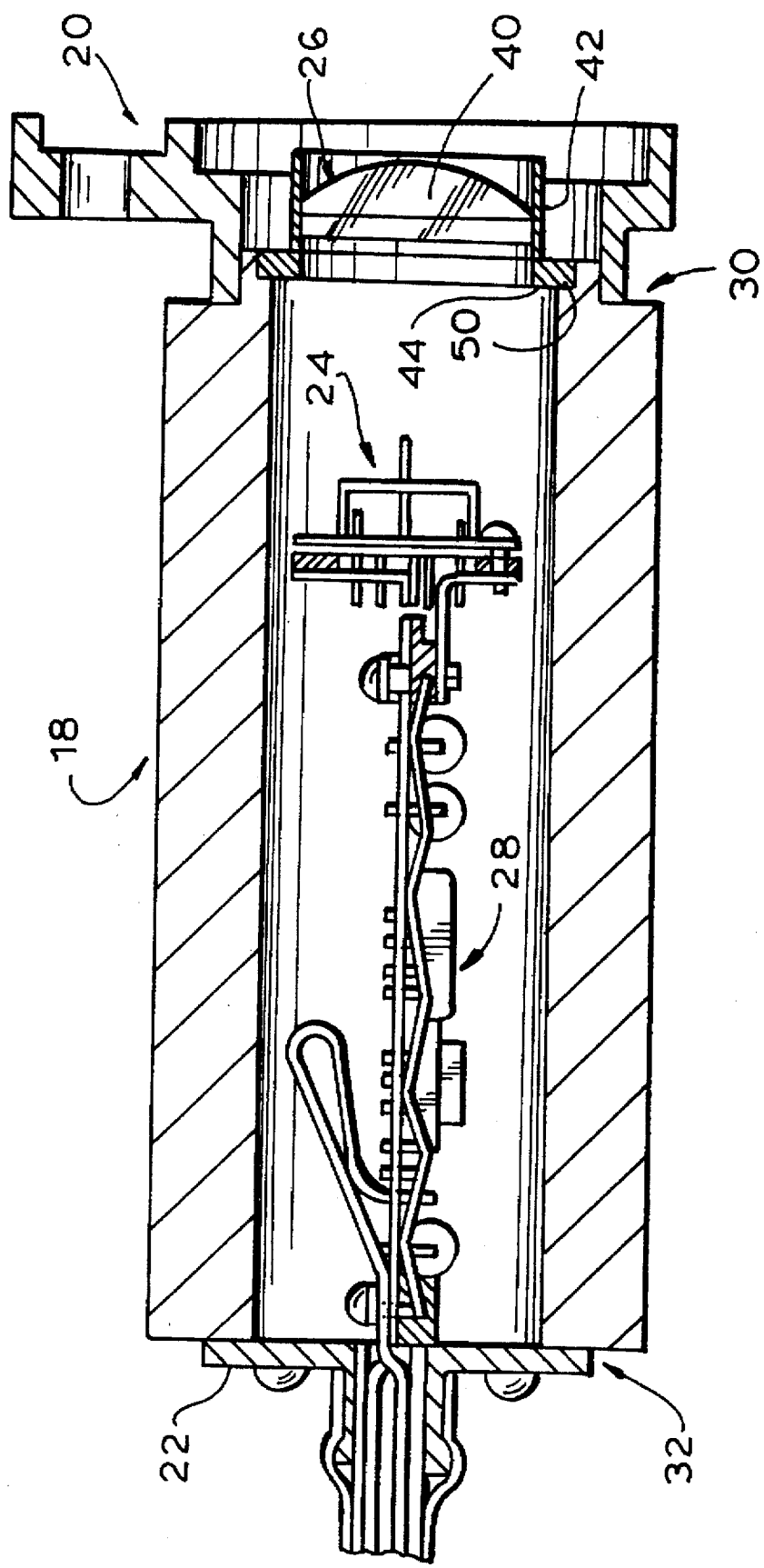
FIG. 3 is a sectional view along lines 3—3 in FIG. 2A.
Figure 4:
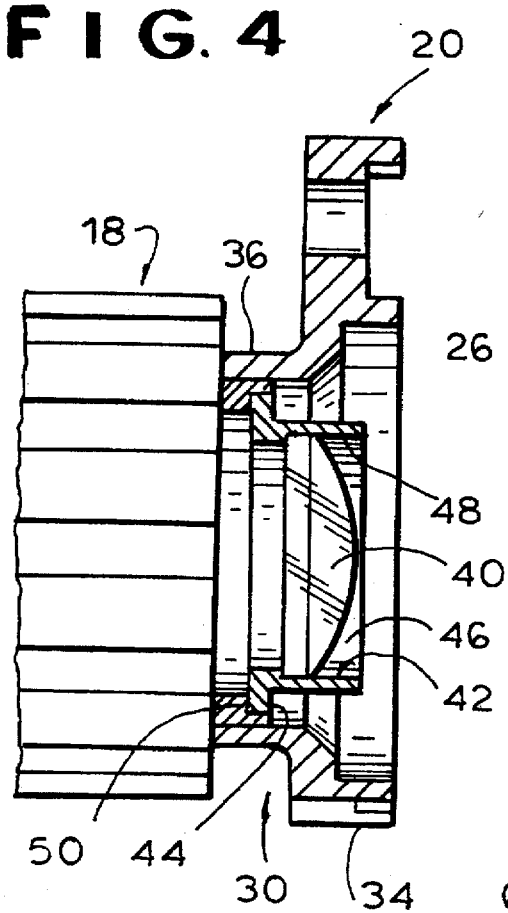
FIG. 4 is a partial sectional view of the optical assembly.

Referring now to FIGS. 2B, 3 and 4, a lens assembly 26 is disposed within housing 18 near the first end 30. Lens assembly 26 includes a lens 40 fabricated from a high temperature optical material transparent to electromagnetic radiation of a spectral frequency $\lambda$ in the band with of from about 190 to 400 nanometers, and preferably within the ultraviolet range of from about 190 to 270 nanometers. In the preferred, albeit exemplary embodiment, the lens 40 is fabricated from synthetic sapphire (AL$_2$O$_3$) with a maximum thickness of about 6.6 millimeters. The sapphire lens 40 is disposed within a lens holder 42, preferably fabricated from KOVAR to withstand the high temperatures generated in the vicinity of the combustor or afterburner section of the gas turbine engine. The lens holder 42 includes a flange 44 and defines a hollow bore therethrough 46 which defines an inner wall 48 against which the lens 40 is brazed in place. The lens holder 42 is attached to the housing 18 by laser welding the flange 44 to the annular cutout 50 defined in the first end 30 of the housing as shown in FIG.

Referring to now to FIGS. 2B and 5–7, the detector assembly 24 is generally comprised of a detector 52, a clamp-ring 54 and a detector holder 56. The clamp-ring attaches the detector 52 to the detector holder 56 with a plurality of fasteners 58 in a conventional manner. The detector holder 56 is attached to the electronics 28 with a clamp 55, the assembly of which in turn is attached to the cover 22 of the housing 18 with fasteners 58 and another clamp 55.

Figure 6:
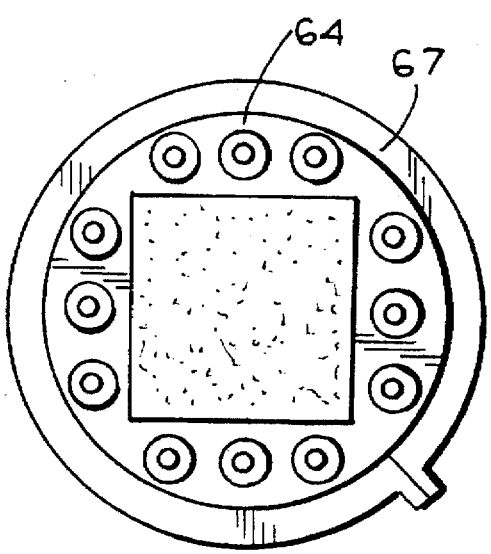
FIG. 6 is a top plan view of the ceramic header.
Figure 7:
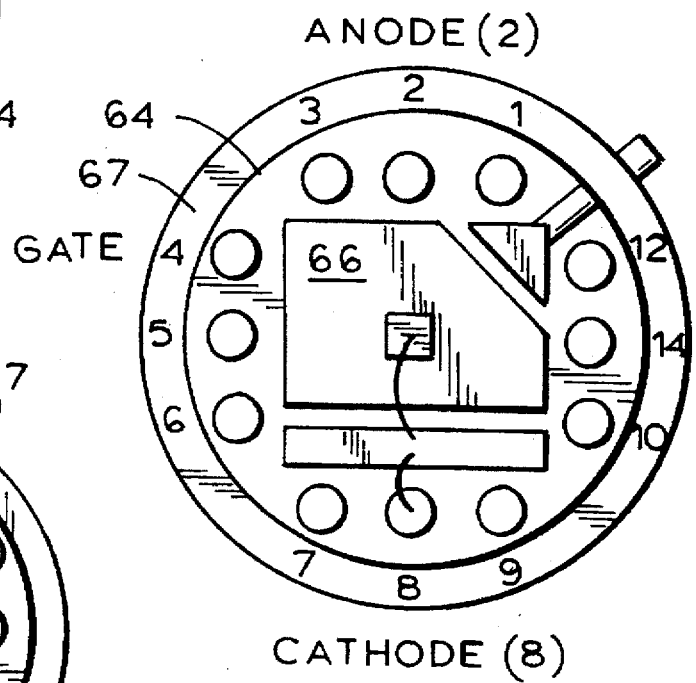
FIG. 7 is a top plan view of ceramic header depicting the photodiode and the electrical connections thereto.
Figure 9:
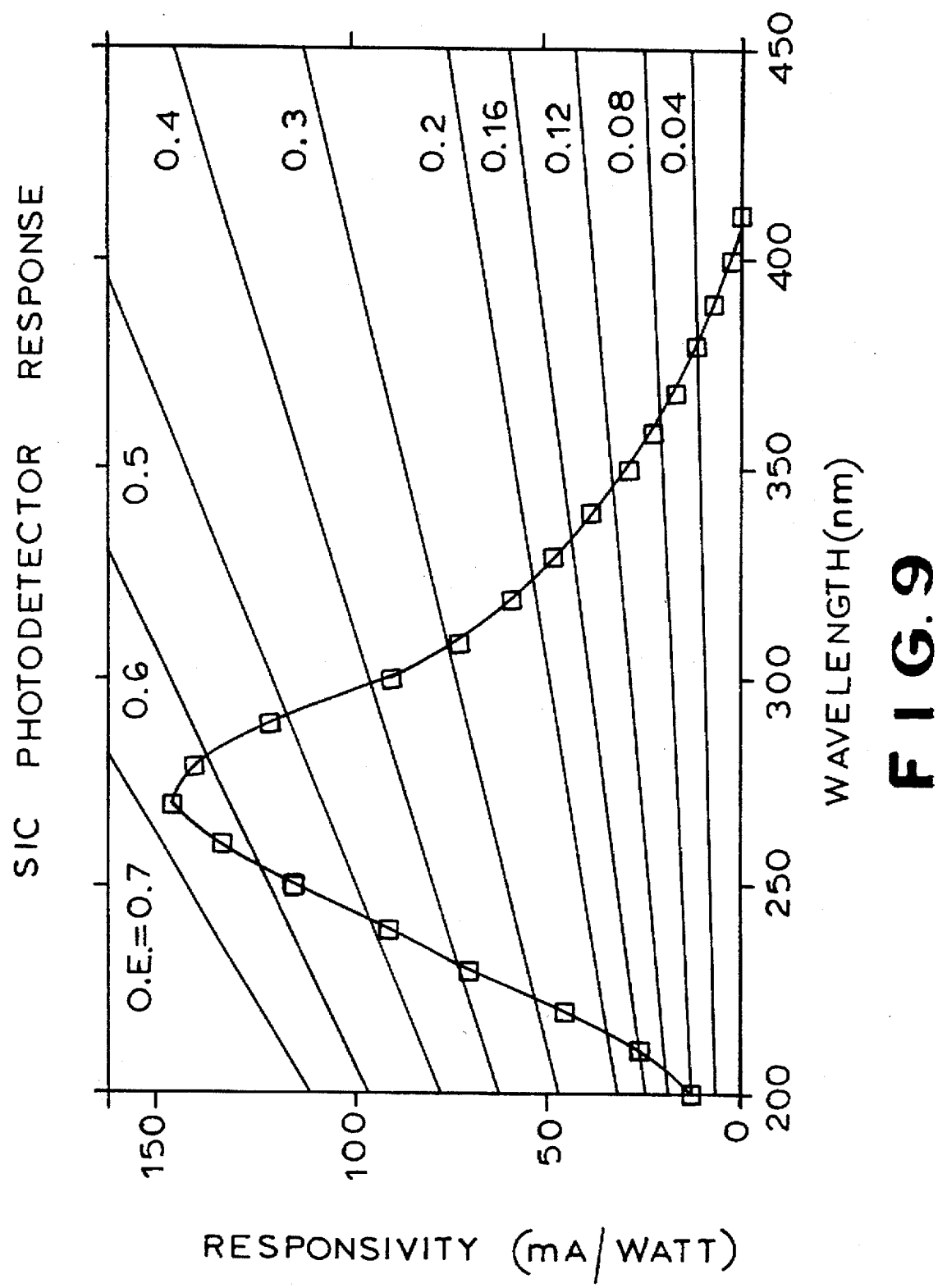
FIG. 9 is a graphical representation of the preferred photodiode response characteristics.
Figure 11:
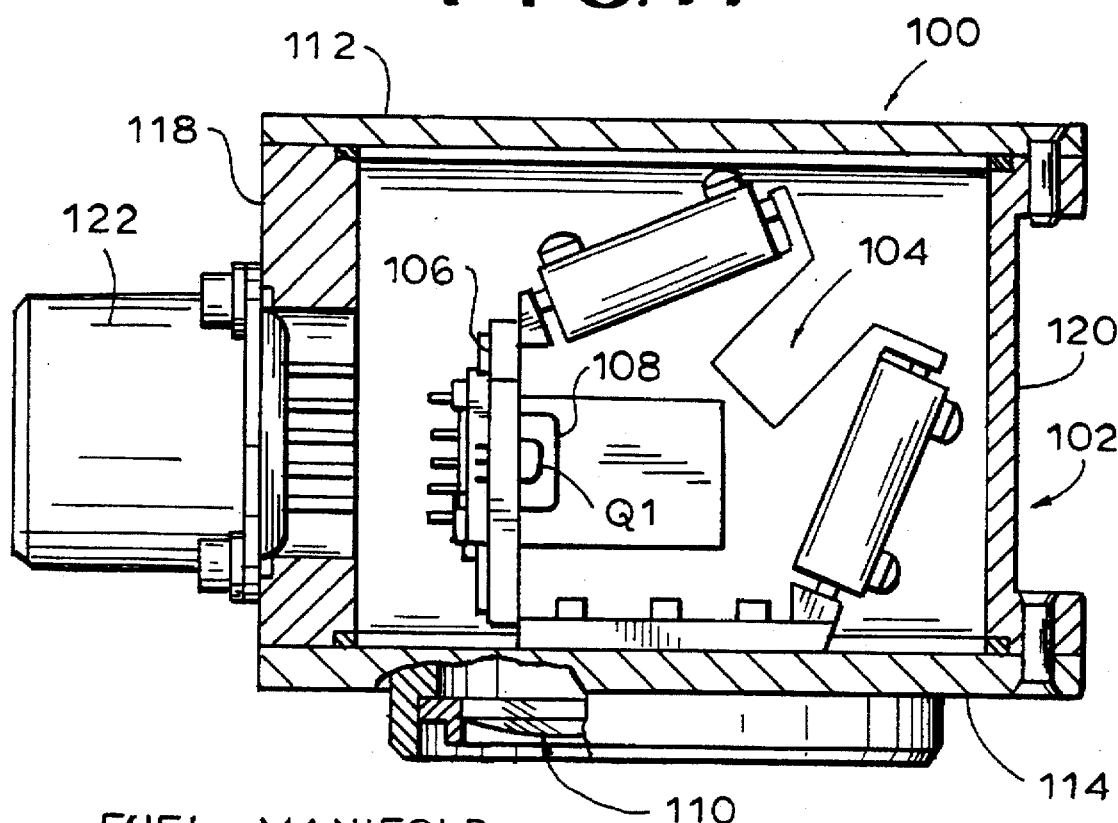
FIG. 11 is a partial sectional view along lines 11—11 in FIG. 10.

The detector 52 is comprised of a detector housing 60 having a window or aperture 62 defined in and disposed near one end thereof, and a ceramic header 64 disposed on a KOVAR flange 67 at the opposite end thereof. A suitable high temperature optical element 61 (e.g., a sapphire lens in the exemplary embodiment of about 0.030 inches in thickness) is sealed with glass against the apertured end of the detector housing 60 for concentrating the incident radiation on the detector element (photodiode 66). The ceramic header 64 (for example, KYOCERA Part No. A673, available from Kyocera Corporation of Kyoto, Japan) includes a silicon carbide photodiode 66 disposed and supported thereon as shown in FIG. 6. A plurality of pin connectors are disposed about the periphery of the photodiode 66 to facilitate electrical attachment thereto as shown in FIG. 7. The silicon carbide photodiode 66 may be of the type shown and described in U.S. Pat. No. 5,093,576 to Edmond et al., the disclosure of which is hereby incorporated by reference. As shown in FIG. 9, such photodiode is responsive to electromagnetic radiation $\lambda$ in the bandwidth of from about 200 to 400 nanometers with a peak responsivity (mA/Watt) in the range of from about 250 to 290 nanometers (i.e., ultraviolet).

The photodiode 66 is a semiconductor which generates electron-hole pairs by photoconductive action. When these charge carriers are generated near a p-n junction, the electric field of the depletion layer at the junction separates the electrons from the holes, the movement of which generates a short circuit current or open circuit voltage. This can be used to create a signal corresponding to the presence and even the intensity of the combustion or afterburner flame.

Figure 8:
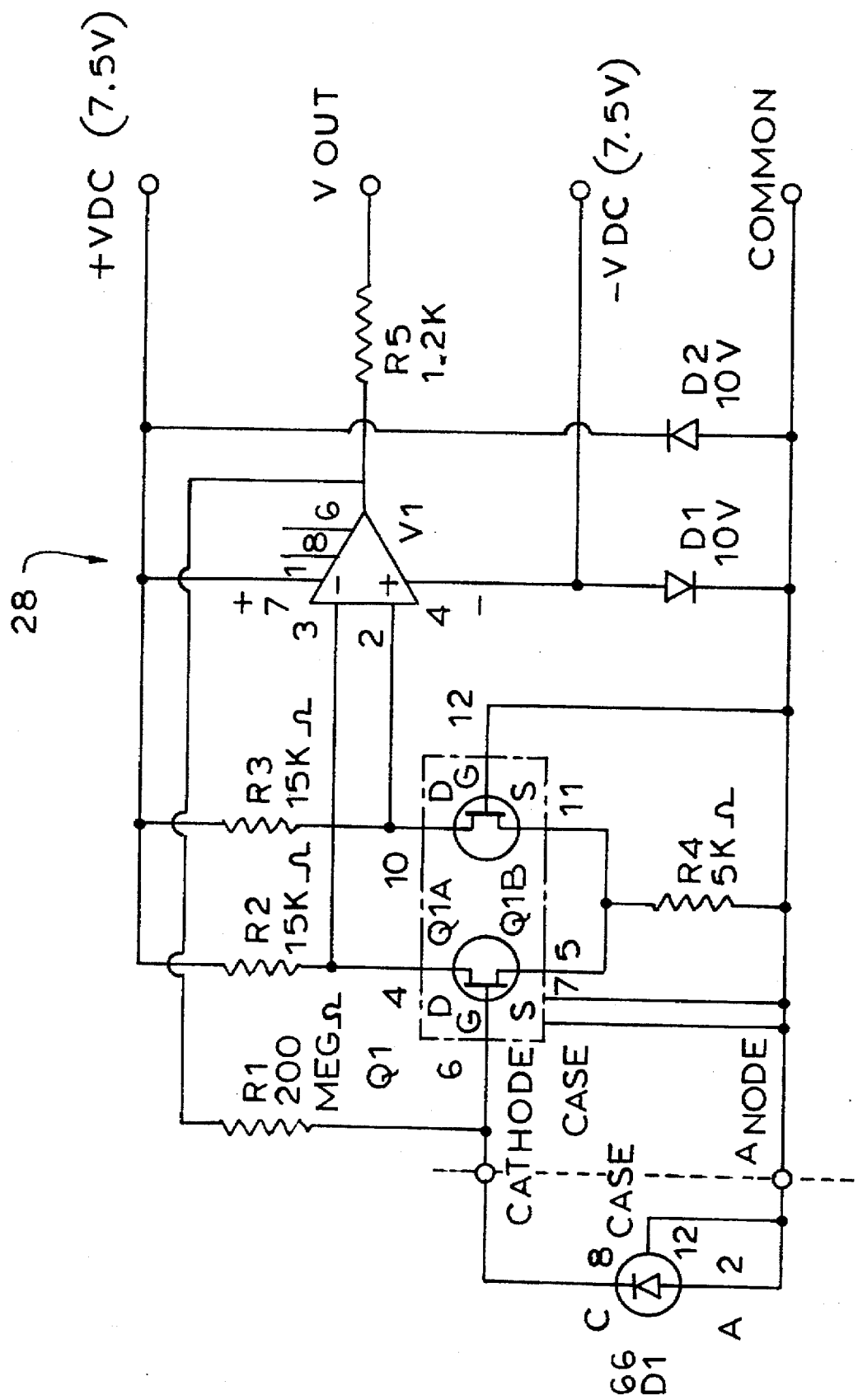
FIG. 8 is a circuit diagram of the sensor electronics.

Referring now to the circuit diagram of FIG. 8, the amplification circuitry provides an output voltage signal (VOUT). In the preferred embodiment, the system operates on the application of a positive voltage (+VDC) of approximately 7.5 Volts and a negative voltage (−VDC) of approximately −7.5 Volts. Accordingly, power consumption is vastly reduced in comparison with the prior art photodetectors described in the background of the specification (i.e., phototubes). The respective +VDC and −VDC are applied to an operational amplifier U1 at respective terminals 7 and 4. The −VDC is attached to common through a Zener diode D1. The +VDC is attached to common through a Zener diode D2 and applied to a dual JFET transistor Q1 comprised of Q1A and Q1B on one side at the respective drains 1, 2 at pin connectors 4, 10, and on the other side, the respective sources 5, 11 are grounded to common. The gate inputs 1, 2 at pin connectors 6 and 12 communicate with the respective cathode C and anode A of the the photodiode 66. When the flame is present, electromagnetic radiation (ultraviolet) incident on photodiode 66 causes electrons to flow from the anode to the cathode (i.e. the gate current) and consequently the amount of current input to the operational amplifier U2 increases such that a measurable voltage V OUT is generated. Testing has demonstrated that with this system flame recognition (light-off or loss) occurs within 200 milliseconds. If desired, the output signal VOUT may be applied to appropriate signal conditioning circuitry for further processing, for example to produce a FADEC compatible signal in systems using FADEC electronics to control engine operation.

Referring now to FIGS. 2 and 10–12, there is depicted a second embodiment of a sensor 100, generally comprised of a sensor housing assembly 102, an optical block assembly 104, a detector mounting plate 106, a detector assembly 108 (see illustrations in FIGS. 5–7 and related description above with regard to the first embodiment) and a lens assembly 110.

Figure 13:
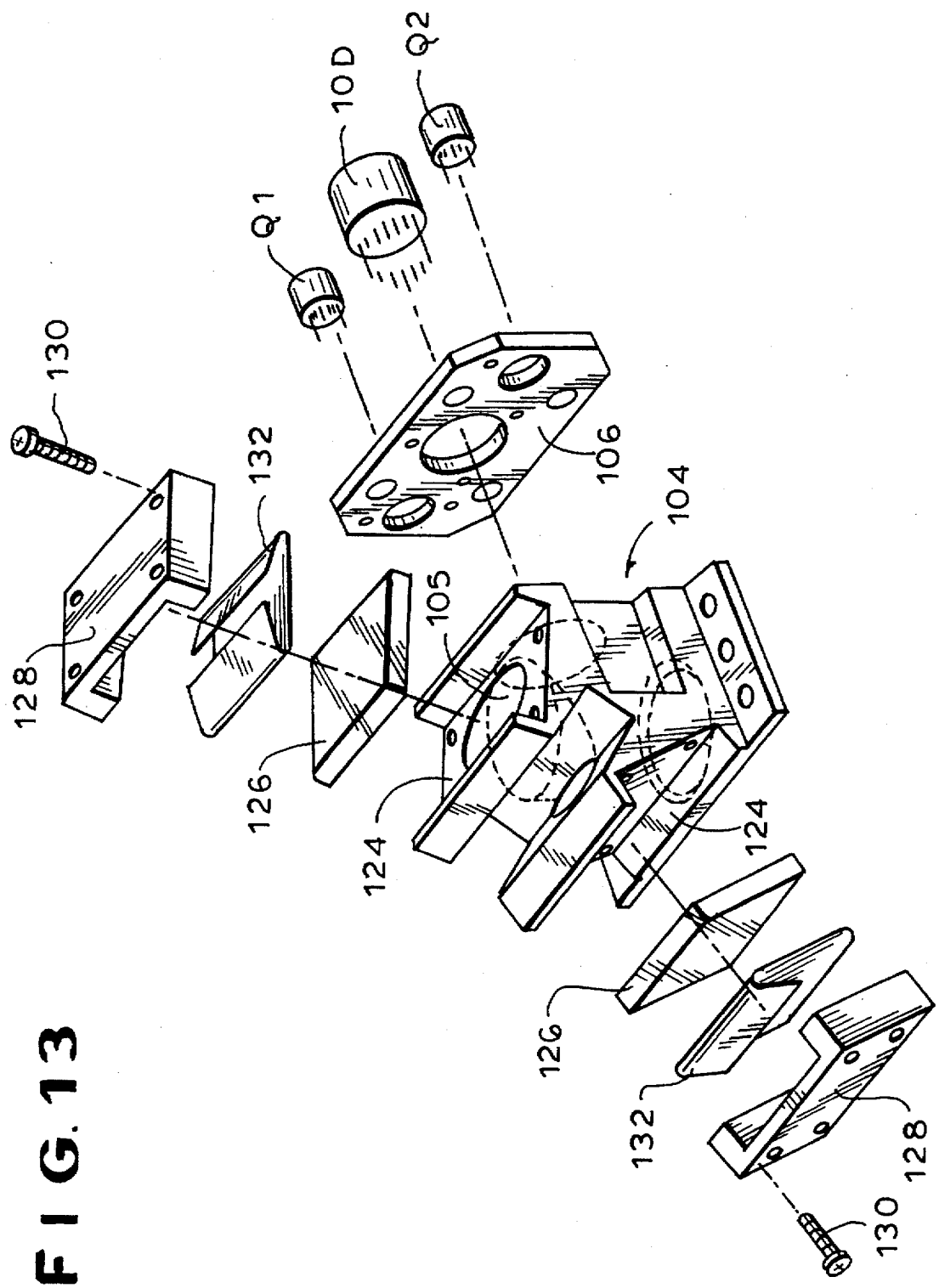
FIG. 13 is an exploded isometric view of the optical block assembly of the second embodiment.

The housing 102 may be fabricated from stainless steel, and includes a top cover 112, an apertured bottom cover 114, a pair of opposed sides 116, an apertured front wall 118 and a rear wall 120, which collectively define a hollow interior. The apertured front wall 118 accommodates a connector 122 to facilitate an electrical connection between the detector assembly 108 and an external source. As shown in FIG. 13, the optical block assembly 104 may be formed with a pair of mirror receiving slots 124 in which a pair of corresponding mirrors 126 are disposed. Each mirror is mounted in slot 124 with a mirror cover 128 fastened to the optical block 104 with a plurality of fasteners 130. A spring 132 is situated between each mirror 126 and the U-shaped channel 134 of the cover 128. Optimally, each mirror 126 includes a dielectric coating which can be deposited on the reflective surface thereof by a multilayer sputter procedure. This coating absorbs and rejects certain wavelengths $\lambda$ of radiation (i.e., above 270 nanometers, visible light) to minimize false sensor indications. Such filtering is critical in an afterburner application where the sensor 100 is disposed proximal to the nozzle of the gas turbine engine because sunlight can cause an erroneous indication of afterburner light-off. In this arrangement, it is desireable to filter out visible light by a factor of at least $10^{4.5}$. It has been found that such filtering minimally reduces (by less than 10%) radiation $\lambda$ in the ultraviolet bandwidth of from about 190 to 270 nanometers.

The optical block 104 defines a plurality of interconnected internal passageways 105 through which incident radiation, first directed through lens assembly 110, is reflected off-axis by the mirrors 126 to the detector assembly 108. Lens assembly 110, in a manner similar to the first embodiment described above and depicted in FIGS. 3 and includes a sapphire lens 134 disposed within and laser welded to a lens holder 136, preferably fabricated from KOVAR. Lens holder 136 has a flange 138 which facilitates attachment to the housing bottom 114 by brazing.

The detector assembly 108 is constructed in accordance with the first embodiment described above and depicted in FIGS. 5–7. The detector 108 is situated on the mounting plate 106 such that it is optically aligned with mirrors 126 and the lens assembly 110. Similarly, the amplification circuitry similar to that shown and described with regard to the first embodiment (FIG. 8), may be incorporated on the detector mounting plate 106. In the exemplary embodiment of FIG. 13, JFET transistors Q1 and Q2 are each disposed on opposed sides of detector 108.

Figure 15:
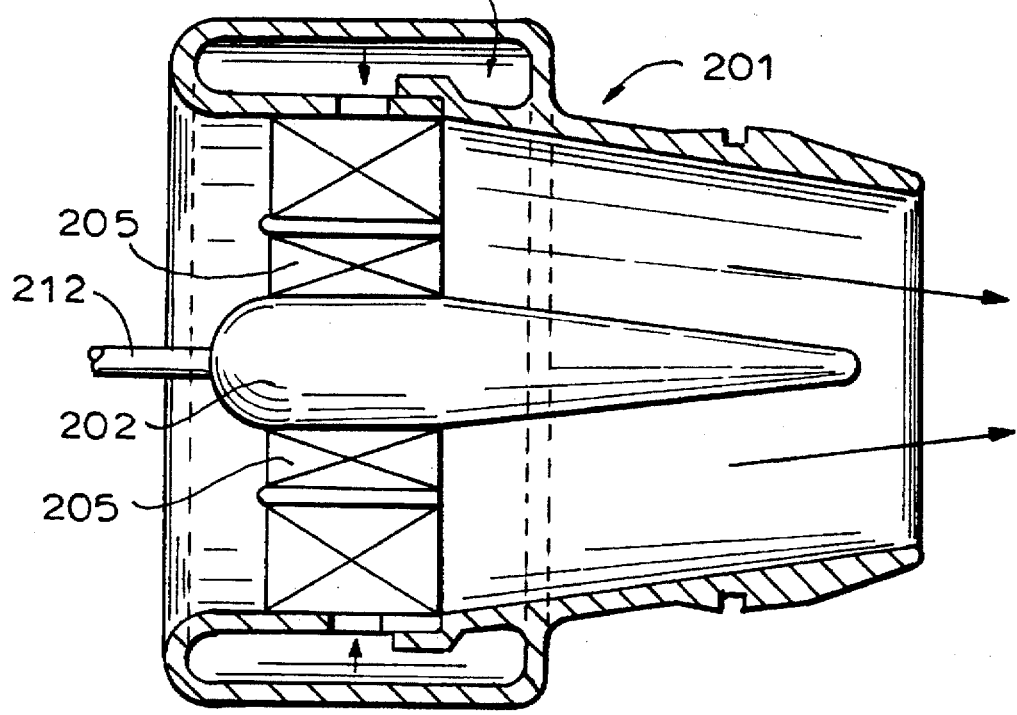
FIG. 15 is an enlarged detail view of a fuel/air premixer.
Figure 12:
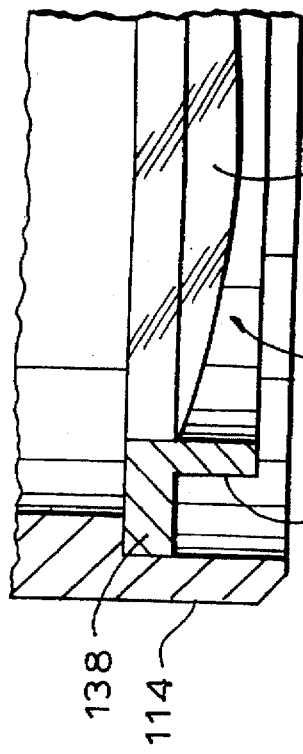
FIG. 12 is an enlarged detail of the optical assembly shown in FIG. 11.
Figure 16:
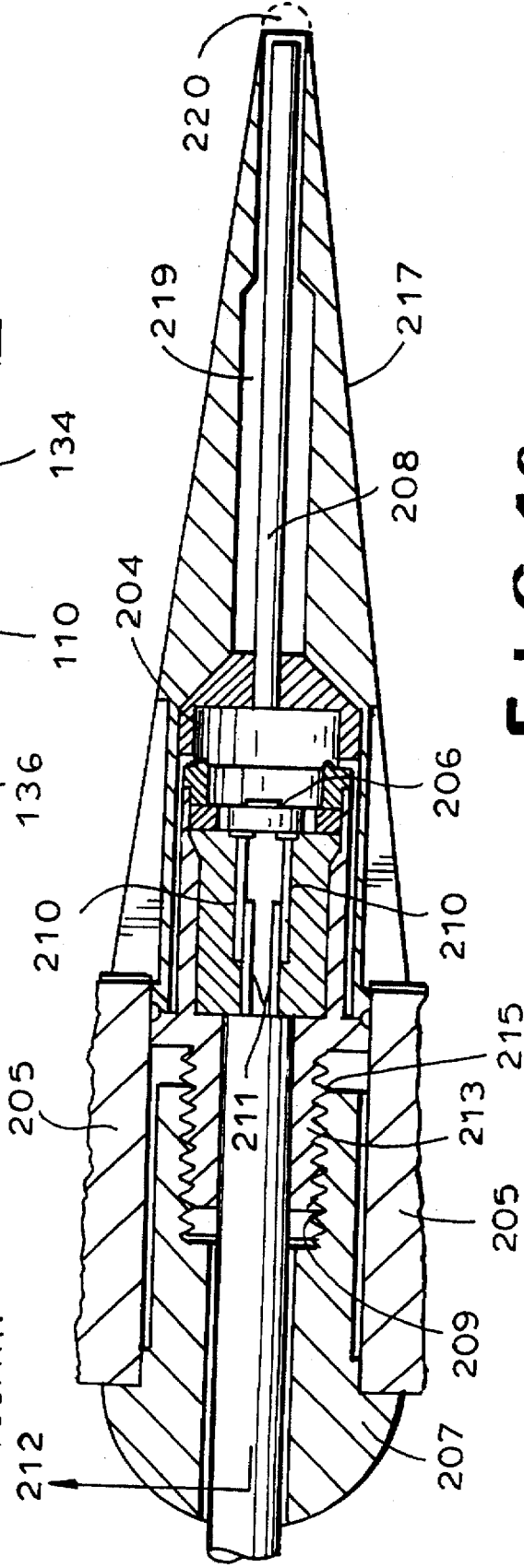
FIG. 16 is a sectional view of a center-body fairing of the fuel/air premixer shown in FIG. 15 having a third embodiment of the sensor disposed therein.

Referring now to FIGS. 14–16, there is depicted a third embodiment of a sensor 200 situated in the fuel-air premixer 201 of a premixed combustion system in an aeroderivative gas turbine engine 203. In such system, fuel and air are premixed through a set of axial-flow swirlers 205 that induce highly sheared counterrotating flow to mix the fuel and air prior to introduction into the combustion chamber 222 for greater engine efficiency. As shown in FIG. 15, a typical fuel-air premixer 201 includes a center-body fairing 202 modified to house an integral sensor disposed in the interior thereof.

Figure 5:
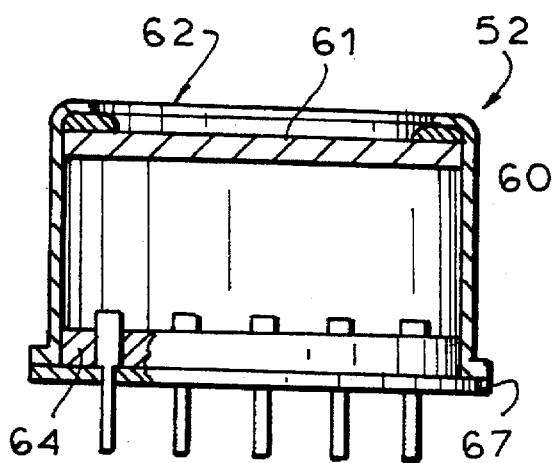
FIG. 5 is a sectional elevational view of the detector assembly.

The sensor 200 comprises a ceramic package assembly 204 having a detector assembly 206 as shown in FIGS. 5–7. The detector 206 is connected to an elongated fiber-optic cable 208 exposed to the combustion chamber and extending axially through the center-body fairing 202 to communicate electromagnetic emissions from the combustion flame to the detector 206. The center-body fairing 202 includes a cap 207 having an internal female thread 209 which is brazed to a base element 213 having corresponding male thread 215. A tailcone 217 is welded to base 213 and includes a hollow bore 219 and open end 220. A pair of pin connectors 210 are brazed to the wires 211 of a mineral-insulated or like cable 212 to communicate signals to and from amplification circuitry disposed at a remote location (not shown, but similar to the hardware depicted in FIG. 8). The operating principles of the sensor 200 are the same as in the first and second embodiments.

The present invention has been shown and described in what are considered to be the most practical and preferred embodiments. It is anticipated, however, that departures may be made therefrom and that obvious modifications will be implemented by persons skilled in the art.

We claim:

1. A high temperature gas stream optical flame sensor for detecting the presence of one of a combustion flame and an afterburner flame in a gas turbine engine, comprising:

silicon carbide detector means responsive to electromagnetic radiation from the flame for generating a proportional photocurrent wherein said detector means comprises:
a ceramic header;
a silicon carbide photodiode mounted on said header and responsive to the electromagnetic radiation from the flame in the spectral range λ of from about 190 to 400 nanometers; and
a detector housing for said header having optical means disposed near one end thereof for concentrating the electromagnetic radiation from the flame on said photodiode;

silicon carbide amplification means for amplifying said photocurrent and for generating a signal indicative of the presence of the flame; and a sensor housing attachable to said gas turbine engine and having said detector means and said amplification means disposed therein.

2. The optical flame sensor recited in claim 1, wherein said optical means include filter means to limit the electromagnetic radiation from the flame to a bandwidth of radiation in the ultraviolet range of from about 190 to 270 nanometers.

3. A high temperature gas stream optical flame sensor for detecting the presence of the combustion flame in a gas turbine engine, wherein said gas turbine engine includes a premixed combustion system having at least one fuel-air premixer in which fuel and air are premixed prior to combustion, said fuel-air premixer including a center body fairing, said optical flame sensor comprising:

silicon carbide detector means responsive to electromagnetic radiation from the flame for generating a proportional photocurrent, said detector means comprising: a ceramic header; a silicon carbide photodiode responsive to the electromagnetic radiation from the flame in the spectral range λ of from about 190 to 400 nanometers mounted on said header; and a detector housing for said header having optical means disposed near one end thereof for concentrating the electromagnetic radiation from the flame on said photodiode;

said detector means being disposed within said center body fairing of said fuel-air premixer.

4. The optical flame sensor recited in claim 3, further comprising fiber-optic cable means for communicating electromagnetic radiation from an opening in said center body fairing to said detector means.

5. A high temperature gas stream optical flame sensor for detecting the presence of one of a combustion flame and an afterburner flame in a gas turbine engine, comprising:

silicon carbide detector means responsive to electromagnetic radiation from the flame for generating a proportional photocurrent, said detector means comprising: a ceramic header; a silicon carbide photodiode responsive to the electromagnetic radiation from the flame in the spectral range λ of from about 190 to 400 nanometers mounted on said header; and a detector housing for said header having optical means disposed near one end thereof for concentrating the electromagnetic radiation from the flame on said photodiode; and a sensor housing attachable to said gas turbine engine and having said detector means disposed therein.

6. The optical flame sensor recited in claim 5, further comprising amplification means for amplifying said photocurrent and generating a signal indicative of the presence of the flame, comprising:

silicon carbide JFET transistor means communicating with said photodiode for amplifying a signal when said photodiode is exposed to the electromagnetic radiation from the flame in said spectral range and producing an output signal indicative of the presence of the flame.

7. The optical flame sensor recited in claim 5, wherein said sensor housing further comprises optical means for concentrating the electromagnetic radiation from the flame on said optical means of said detector housing, wherein said optical means of said sensor housing are integral with said sensor housing.

8. The optical flame sensor recited in claim 7, wherein said optical means of said sensor housing comprises a sapphire lens.

* * * * *